Oct. 16, 1962 H. W. BLETZ 3,059,085
TEMPERATURE CONTROL CIRCUIT
Filed Sept. 18, 1959 2 Sheets-Sheet 1

INVENTOR.
HOWARD W. BLETZ
BY
ATTORNEYS

INVENTOR.
HOWARD W. BLETZ

United States Patent Office 3,059,085
Patented Oct. 16, 1962

3,059,085
TEMPERATURE CONTROL CIRCUIT
Howard W. Bletz, Lexington, Ohio, assignor to Stevens
Manufacturing Company, Inc., a corporation of Ohio
Filed Sept. 18, 1959, Ser. No. 840,935
13 Claims. (Cl. 219—20)

The invention relates in general to temperature control circuits and more particularly to an electrical control circuit for controlling the temperature of a heating unit which heats a vessel or cooking utensil wherein the temperature of the vessel is sensed and used for control of the heating unit.

The invention may take many different forms and one immediate use of the temperature control of the invention is to control a burner or surface heating unit on a stove or range such as a household stove wherein a sensing unit is employed at the heating unit to sense the temperature of the cooking utensil and automatically control the heating unit to maintain a predetermined temperature. This assures that, even should the liquid within the vessel boil away, the heat to the heating unit is reduced sufficiently to maintain substantially constant temperature of the vessel. This is in contradistinction to the burners or heating units now in use on many household stoves wherein the degree of heat produced is completely uncontrolled other than a manual setting and, should the pan or vessel boil dry, the food within the pan would burn because of the considerably smaller heat absorption properties of the food remaining within the vessel.

Automatic temperature control systems for range or stove surface units are known at the present time, but those in use are considerably more complex and less positive in action than the temperature control of the present invention. And also the presently used automatic temperature controls do not provide as many features as are provided by the present temperature control.

Accordingly, an object of the invention is to provide an automatic temperature control for controlling the temperature of a vessel heated by a heating unit which temperature control is simple, reliable, and economical to manufacture and which has a variety of control functions to accommodate itself to all ordinarily encountered variables.

Another object of the invention is to provide a range surface unit control wherein a sensing unit senses the temperature of the vessel primarily rather than the temperature of the heating unit itself.

Another object of the invention is to provide a temperature control which utilizes low voltage so as to be safe for operation by unskilled persons and also so that heavy electrical insulation need not be used which also necessarily acts as heat insulation.

Another object of the invention is to provide an electrical control system having control contacts provided with a snap action make and break.

Another object of the invention is to provide a temperature control system which inherently operates at its most sensitive point by choice of the impedance of the circuit.

Another object of the invention is to provide a range surface unit control wherein a sensing unit senses the temperature of a pan heated by the surface unit and controls heat imparted to a temperature responsive member to open and close contacts controlling flow of heat to the surface unit.

Another object of the invention is to provide for a heating unit proportioning means which is in addition to the main control which is controlled in proportion to the heat given off by the heating unit to give a proportioning effect which considerably increases the rate of cycling of the contacts as compared to the operation obtained with the main control only.

Another object of the invention is to provide a proportioning control which permits various degrees of boiling of liquid within a vessel heated by the surface unit with various amounts of wattage input without an appreciable change in temperature of the vessel.

Another object of the invention is to provide a compensating means which incorporates a temperature responsive means such as a bimetal element which deflects due to ambient temperature and wherein this deflection is in opposition to the effect produced by deflection of the main and proportioning temperature responsive means so as to keep the contacts in relatively the same position.

Another object of the invention is to provide a voltage compensating means to compensate for changes of voltages applied to the entire temperature control system.

Another object of the invention is to provide primary and auxiliary bimetallic structures with means for cycling the auxiliary structure to control the temperature of the primary structure in conjunction with control derived from the temperature of a vessel and with voltage compensation means on the auxiliary structure, in turn, providing voltage compensation to the entire control system.

Still another object of the invention is to provide voltage compensation for a temperature control system wherein two separate windings are provided on two separate bimetallic structures and with the combined effect of the two windings being in opposition for changes in applied voltage.

Another object of the invention is to provide for flow of current to the heating unit through a portion of the temperature responsive means so that heat generated by this passage of current is used to give a proportioning effect which also is a form of compensation for changes of voltage and hence wattage to the unit because, with lower voltage there is a smaller current through the proportioning temperature responsive means which produces longer "on" times of the contacts to compensate for the lower wattage input to the heating unit.

Other objects and a fuller understanding of this invention may be had by referring to the following description and claims, taken in conjunction with the accompanying drawing, in which:

Figure 1:
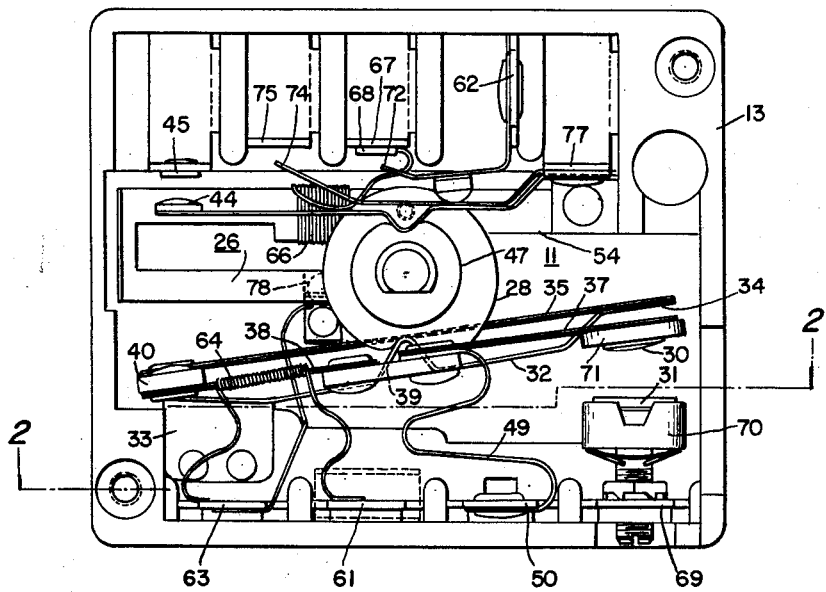
FIGURE 1 is a plan view with the cover removed of the temperature control system of the invention.
Figure 2:
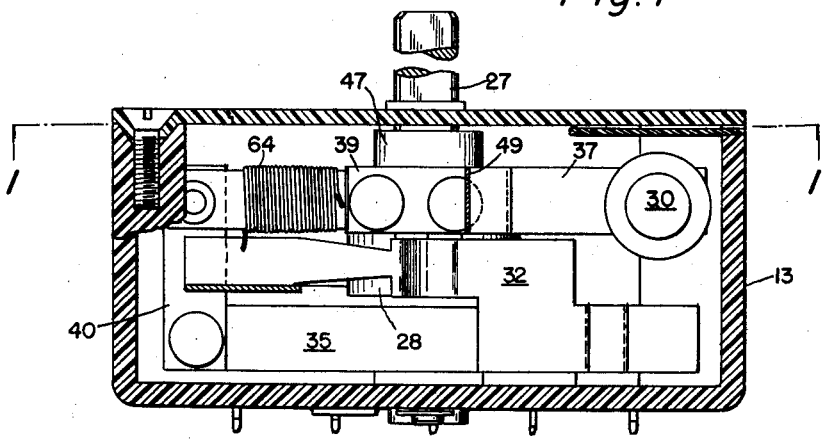
FIGURE 2 is a sectional view on line 2—2 of FIGURE 1.
Figure 3:
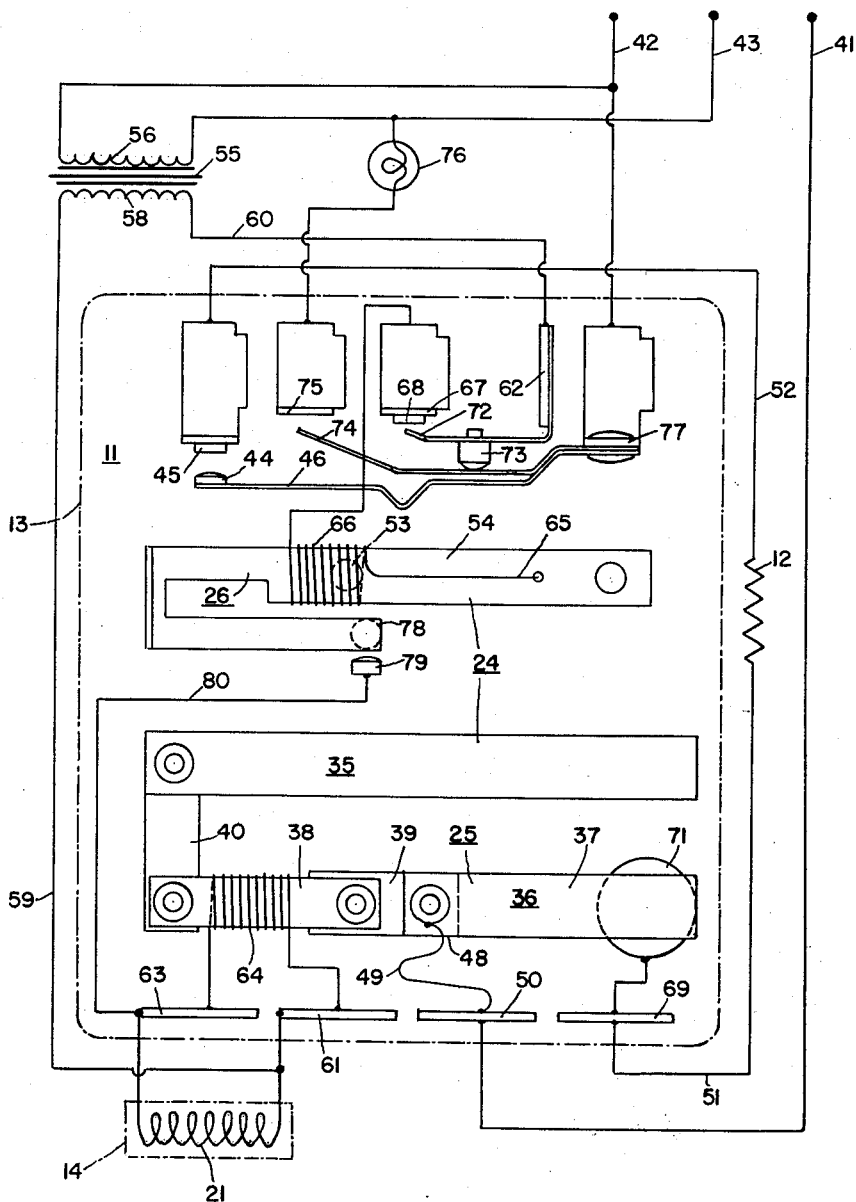
FIGURE 3 is a schematic diagram of the temperature control system.

FIGURES 1, 2 and 3 show the preferred embodiment of the invention of a temperature control system 11 for controlling the temperature of a heating unit 12 which in this case has been shown as an electrical heating unit or range surface unit. The control system 11 includes generally two parts contained within a control enclosure 13 and a sensing unit enclosure 14. The sensing unit enclosure 14 may conveniently be mounted coaxially with the heating unit 12, although the face of coaxial mounting is not essential but merely convenient. The enclosure 14 contains a sensing coil 21, and any form of means may be employed to maintain good heat transfer from a vessel to be heated by the surface unit 12 to the sensing coil 21.

The sensing coil 21 is contained within the enclosure 14 and covered with thin insulation only sufficient to insulate low voltage such as twenty-four volts, and therefore, with this thin insulation there is good heat exchange relationship between the vessel and the sensing coil 21.

The control enclosure 13 may be placed physically anywhere with respect to the heating unit 12, and this provides considerable flexibility in design of the stove or range with which this temperature control might be used. The control enclosure 13 may be placed at a considerable distance from the heating unit 12 and at any attitude relative thereto because it is not connected thereto by any mechanical linkage, but only by electrical wires which may be, and generally are, flexible. This provides for an advantage of the present temperature control in that the control system 11 may be positioned out of heat exchange relationship with the heating unit 12 so that the ambient temperature around the enclosure 13 may be relatively low to thus assure a sensitive yet dependable and accurate temperature control system.

The control enclosure 13 journals a control shaft 27 which carries a cam 28 for adjusting the operating condition of temperature responsive or bimetallic means 24. The bimetallic means 24 has been shown in this preferred embodiment as including primary and auxiliary bimetallic composite structures, 25 and 26, respectively. The primary bimetallic structure 25 is a composite structure in a generally U-shape and acting on or controlling control contacts or primary contacts 30 and 31. In this particular embodiment, the first control contact 30 is shown as being movable and positioned on the primary bimetallic structure 25 and the second control contact 31 is shown as being stationary. A spring cam follower 32 has a first end 33 fixed in the enclosure 13. This cam follower 32 cooperates with the cam 28 to be moved transversely. A second end 34 of the cam follower 32 carries the primary bimetallic structure 25 which in this case is shown as being U-shaped. Three separate control functions are provided by the primary bimetallic structure 25 and these three functions are provided in this case by three separate bimetallic elements. The U-shaped bimetallic structure 25 has first and second legs 35 and 36. The first leg 35 is a compensating temperature responsive element or bimetallic element and the second leg 36 includes a proportioning temperature responsive element or bimetallic element 37 and a control or main temperature responsive element or bimetallic element 38. The bimetal elements 37 and 38 are connected by an insulator 39 and the base of the U is another insulator 40. These insulators and bimetal elements are rigidly connected together to make a relatively rigid U-shaped composite structure.

A three-wire voltage supply source is commonly used with this temperature control system and includes a first line 41, a second line 42, and a neutral 43. Lines 41 and 42 may have two hundred thirty volts, for example, and this voltage is supplied to the heating unit 12 through power contacts 44 and 45 and also through the control contacts 30 and 31. The power contact 45 is shown as fixed and power contact 44 is shown as movable and carried on a contact blade 46 controlled by a cam 47 on the shaft 27. The proportioning bimetal 37 has an inboard end 48 to which a flexible pigtail 49 is fixedly attached. The other end of this pigtail 49 goes to a terminal 50 which is connected to the first line 41. By this means the electrical circuit to the heating unit 12 is completed from lines 41 to 42 through the terminal 50, the pigtail 49, the proportioning bimetal 37, contacts 30 and 31, a line 51, the heating unit 12, a line 52, the contacts 44 and 45, the contact blade 46 and returned to the line or voltage source terminal 42.

A transformer 55 has a primary 56 connected between the neutral 43 and the line 42. This places the transformer in the circuit and energized at voltage of line in neutral, which may be one hundred fifteen volts, for example. The transformer 55 has a secondary 58 which energizes lines 59 and 60 connected to terminals 61 and 62. The sensing coil 21 is connected between terminal 61 and a terminal 63 and connected in parallel therewith is a control winding 64 on the control bimetal 38. This combination forms sensing control means to sense the temperature of a vessel and to control same.

The control contact 31 is mounted on an adjusting screw on a terminal 69 and a small permanent magnet 70 surrounds the contact 31. A steel washer-shaped armature 71 surrounds the movable contact 30; and when the contacts 30 and 31 are closed, the armature 71 does not quite touch the magnet 70. The use of the magnet 70 and armature 71 gives a form of snap action to the contacts for quick make and break.

The auxiliary bimetallic structure 26 is a unitary U-shaped piece of bimetal fastened as by spot-welding 53 to an extension 54, the outboard end of which is fastened to the enclosure 13. This auxiliary bimetallic structure 26 is positioned beneath the cam 28 but is not acted on by this cam, rather it is acted on by a voltage compensation winding 66 which has one end fastened to the extension 54 and the other end fastened to a fixed terminal 67. This terminal 67 carries a fixed contact 68 engageable by a movable contact 72 which moves with the main contact blade 46 through an insulator 73. An auxiliary contact blade 74 is also moved with the main contact blade 46 to engage a fixed terminal 75 connected in circuit with a pilot lamp 76. The main contact blade is connected to a terminal 77 which is connected to the line 42. Hence, when the contacts 74 and 75 are closed, there will be line to neutral voltage, for example, one hundred fifteen volts across the pilot lamp 76. Also when the auxiliary contacts 68 and 72 are closed, voltage from the secondary 58, which may be in the order of twelve to twenty-four volts, will be applied to the voltage compensation winding 66 and through this winding and the auxiliary bimetallic structure 26 to a movable auxiliary contact 78. This movable contact 78 coacts with a fixed contact 79 connected by a line 80 to the terminal 63. Thus, when contacts 78 and 79 are closed, a low voltage circuit is completed through the voltage compensation winding 66 and the sensing coil 21 to the secondary 58.

*Operation*

The present temperature control system is quite simplified and yet has many control functions which permit it to be highly reliable in use. The entire control enclosure 13 may be placed at a remote position from the heating unit 12 so that it is not heated directly by heat exchange from the heating unit 12; and this makes the ambient temperature at the control enclosure quite low and uniform for consistent operation. Also, the entire control system is capable of operating contacts 30 and 31 directly without need of going through a relay in order to obtain an amplification of power.

The control shaft 27 has an off position, the position shown in the drawing, and in such position the cam 47 moves the contact blade 46 so that power contacts 44 and 45 are disengaged. Whenever the control shaft 27 is moved from this off position, the power contacts 44 and 45 will be closed. The cam 28 has a generally spiral surface to vary the position of the spring cam follower 32 and hence the position of the entire primary bimetallic structure 25. There may be three main temperature ranges for the control shaft 27, the warm range, the boil range, and the fry range. Each of these may have high, medium, and low settings. If the shaft 27 is moved counterclockwise, as viewed in FIGURE 1, it first reaches the low setting in the warm range at which the contact 30 is lowered sufficiently to engage contact 31, however, the spring cam follower 32 is stressed the least of all settings in the operating temperature range. Other positions of the control knob 26 establish the contact 30 pressed even more tightly into engagement with the contact 31 and thus control the ultimate or desired temperature setting of the vessel.

With a vessel resting on the heating unit 12 and also in good heat exchange relationship with the sensing coil 21 and with the control shaft 27 positioned at one of the operating settings, current from the line 41 flows through the proportioning bimetal 37 and the heating unit 12. This flow of current heats the vessel and it also heats the proportioning bimetal 37. As the vessel increases in temperature, this also increases the temperature of the sensing coil 21 to increase its resistance. Current from the transformer secondary 58 then is increasingly shunted through the control winding 64 to impart more and more heat to the control bimetal 38 when the auxiliary contacts 78 and 79 are closed. The voltage compensation winding 66 heats the auxiliary bimetallic structure 26 since the auxiliary contacts 78 and 79 are initially closed. The high expansion side of the bimetallic structure 26 is on the top as viewed in FIGURES 1 and 3. Hence, heating of this bimetallic structure 26 at the voltage compensation winding 66 causes flexing at this point to open the contacts 78 and 79. Once these contacts are open, the low voltage circuit is broken, hence there is no current flow through the voltage compensation winding 66, the control winding 64, or the sensing coil 21. Accordingly, the auxiliary bimetallic structure 26 cools to reclose the auxiliary contacts 78 and 79. This is a cycling means which cycles these contacts at a slow rate, which might be in the order of two or three seconds closed and four to six seconds open. During the time that the contacts 78 and 79 are closed, current flows through the control winding 64 in accordance with the impedance of the sensing coil 21. The more heat that is imparted to the vessel from the heating unit 12, the more heat there is imparted to the sensing coil 21, and hence, its impedance is increased to divert more current to the control winding 64. All the bimetals 37, 38, and 35 have the high expansion side on the bottom so that, upon temperature increase, each flexes upwardly. The upward flexing of the control bimetal 38 moves the contact 30 away from contact 31 to break the circuit to the heating unit 12. This is the main control function to control the on and off times of the control contacts 30 and 31 and hence provides the primary control of the average temperature of the heating unit 12, and hence, the temperature of the vessel. Because the current to the heating unit 12 flows through the proportioning bimetal 37, additional heat is received by this conduction current. This heat causes the proportioning bimetal 37 to deflect upwardly to also open the contacts 30 and 31. When the contacts are open, the conduction current ceases; hence, the proportioning bimetal 37 cools to reclose the control contacts 30 and 31. This gives a proportioning effect which considerably increases the rate of cycling as compared to the operation obtained with the control bimetal 38 alone. This is desirable because it gives a more uniform temperature control of the vessel throughout the entire temperature range as selected by the control shaft 27.

The resistance of the sensing coil 21 is preferably made of low value, for example, ten to twenty ohms, and the resistance of the control winding is preferably made of the same order. This substantial equality of the two resistance values means that inherently the device has the greatest sensitivity of which it is capable.

The compensating bimetal 35 provides compensation for changes in ambient temperature. The entire primary bimetallic structure 25 is positioned in one location; namely, within the control enclosure 13, hence the ambient temperature thereabouts will be uniform on all parts of the legs thereof. If this ambient temperature increases, the compensating bimetal 35 deflects upwardly as do the control and proportioning bimetals 38 and 37. The construction, however, is such that this deflection of the compensating bimetal opposes the deflection of the combined bimetals 37 and 38. This is so because the base of the U, the insulator 40, will deflect upwardly under action of the compensating bimetal 35 since end 34 is stationary in any given operating position, and this upward deflection of insulator 40 is the same as that deflection caused by increased ambient temperature on the bimetals 37 and 38 which make up the second leg 36. Consequently, the control contact 30 remains in the same position as formerly.

The auxiliary bimetallic structure 26, since it is U-shaped, also is ambient temperature compensated. Changes in the ambient temperature affect both legs of this auxiliary bimetallic structure 26 equally; hence the base of the U merely flexes up and down without change of the relative positions of the contacts 78 and 79.

The voltage compensation winding 66 not only furnishes the motivating force for the cycling means of this auxiliary structure 26, but it also provides a voltage compensating feature for the entire control system 11. An increase of voltage, e.g., at the supply terminals 41, 42 and 43, causes increased voltage at the secondary 58. This causes increased voltage on the control winding 64 to increase the heating effect thereof on bimetal 38. However, a proportionate change in voltage is also applied to the voltage compensating winding 66 which heats the auxiliary structure 26 an increasing amount, and hence, the rate of cycling of this auxiliary structure 26 is increased and additionally the proportion of the "off" times to the "on" times is increased. Accordingly, this decreases the average crrent and maintains a constant average wattage in the secondary 58, and hence, the control winding 64 is energized a proportionate shorter time and this compensates for the additional voltage thereon to maintain constant average wattage on the control winding 64. Accordingly, increased voltage which acts on the control winding 64 to attempt to increasingly open the contacts 30, 31 has an opposite effect on the auxiliary bimetallic structure 26 and these two effects act in opposition to maintain a substantially constant position of the movable primary contact 30 regardless of voltage changes.

The fact that the voltage compensating winding 66 is in series with the parallel circuit of control winding 64 and sensing coil 21 provides increased sensitivity to the entire control system 11. Increased temperatures, for example, on the sensing coil 21 increases its resistance to shunt more current through the control winding 64 to cause the control bimetal 38 to deflect upwardly. At the same time the total effective resistance of the paralleled circuit of sensing coil 21 and control winding 64 increases to thus decrease the current in the compensating winding 66 since it is in series therewith. The decreased current in compensating winding 66 tends to decrease the temperature of the auxiliary bimetallic structure 26 to close the contacts 78 and 79 a greater proportion of the time and thus impart a greater average heat to the control bimetal 38. These effects are additive toward opening the contacts 30 and 31 and, as a result, these contacts have about twice the movement they would have considering only the control winding 64 alone.

The fact that the sensing coil 21 is operated on low voltage, e.g., twelve or twenty-four volts, means that the electrical insulation on this sensing coil may be very thin and, as a result the heat insulating properties are very small so that the entire control system 11 inherently has very good temperature sensing properties to maintain closely the desired temperature.

The flexible pigtail 49 is a means of imparting heat to the proportioning bimetal 37 which heat is proportional to the heating effect of the heating unit 12. A heater winding similar to windings 64 and 66 could have been used to carry the load current and impart heat to the proportioning bimetal 37; however, this would have necessitated electrical insulation therebetween which would have been heat insulation, and it is found that the present system of conduction current heating of the proportioning bimetal 37 is preferable. In case of low voltage on the supply terminals 41 and 42 and hence on the heating unit 12, both the wattage and current are decreased. This smaller current flowing through the proportioning bimetal 37 produces longer on times and shorter off times of the contacts 30 and 31 which compensates for the lower wattage input to the heating unit 12. The opposite is true in case of a voltage increase which proportionately decreases the length of the on times with respect to the off times.

For low wattage heater units 12 or for low wattage output settings for the control system 11, the primary and auxiliary bimetallic structure 26 may cycle on and off in unison. For high wattage settings, it has been found that the auxiliary bimetallic structure 26 cycles on and off two or three times for each on and off cycle of the main contacts 30, 31. This is because the main contacts 30, 31 need to be closed a much greater percentage of the time in order to provide the higher wattage input to the heating unit 12.

The proportioning bimetal 37 also performs still another and very important function; namely, to permit various rates of boiling with various wattage inputs to the heating unit 12 without appreciable change in temperature of the vessel. This is one of the most serious problems to overcome in any automatic temperature control of a vessel heated by a heating unit. It is desired that the temperature of the vessel increase throughout the warm range and again throughout the fry range, but during the boil range, which principally means the boiling of water, the temperature of the vessel will stay at about two hundred twelve degrees Fahrenheit. Various amounts of boiling are required, however. In other words, low, medium, and high boil settings should be provided in order to give the operator a choice of amounts of boiling, and to take into account the fact that widely different quantities of water may be used.

For a medium warm setting of the control shaft 27, for a temperature of about 150°, the control contacts 30 and 31 may be closed only about ten to twelve percent of the time to maintain this medium warm temperature. For a medium boil setting of a vessel containing water, a fairly high wattage input is required, and the control contacts 30 and 31 may be closed about sixty percent of the time, yet the temperature of 212° is not much greater than before. For a medium boil setting with a dry vessel, which may occur if a vessel formerly containing water should boil dry, the heat input requirements of the vessel are very greatly reduced and instead of requiring the contacts to be closed about sixty percent of the time, they need be closed only about fifteen percent of the time. The present control system limits the vessel temperature to about three hundred twenty degrees, which is not a high enough temperature to burn the food. Without this automatic temperature control, should a vessel boil dry, the temperature could easily reach seven hundred or eight hundred degrees which quickly burns the food cooking within the vessel.

For a medium fry setting, such as for grease or the like in the vessel for a frying condition at about four hundred degrees, the wattage input is so small as to require closing of the contacts only about twenty-five percent of the time. This shows that far less wattage input is required for a medium fry, which is at a higher temperature, than for a medium boil, which is at a lower temperature. This particular problem comes about because of the natural phenomenon of requiring tremendous amounts of heat to change liquid into steam without changing its temperature compared with raising the temperature of the same amount of liquid one degree. Practically all automatic temperature control systems in the past have failed to adequately provide this wide range of boil conditions.

The proportioning bimetal 37 permits this great increase in wattage from one end to the other of the boil range without appreciable increase in temperature of the vessel. It does this by the fact that the cam 28 effectively changes the position of control contact 30 or, looking at it in another way, it changes the stress on the bimetals so as to change the opening and closing temperatures of the control contacts 30 and 31. For a high boil setting the contact 30 is positioned closer to contact 31 or with greater stress on the bimetal structure 25 than for a low boil setting. This means that greater conduction current caused by longer on times is required to create the added deflection to the proportioning bimetal 37 in order for contacts 30 and 31 to be opened with the high boil settings. Thus, the proportioning bimetal changes the proportion of on times to off times throughout the boil range so that low, medium, and high boil settings may be obtained.

If the voltage compensating winding 66 were not used, then low voltage would cause high temperature on the vessel, because there will be low voltage on control winding 64 to impart a smaller amount of heat to the control bimetal 38. This means that higher temperature of the vessel and sensing coil 21 would be required in order to make the control bimetal 38 deflect sufficiently to open the contacts. Conversely, high voltage would cause lower temperature of the vessel.

The voltage source 41, 42 and 43 is a form of potential heat energy to supply heat to the heating unit 12 which source also might be a gas or oil supply pipe with unit 12 being a fluid fuel burner. The main or control contacts 30 and 31 are operating portions controlling the flow of this potential energy from the source to the heating unit 12 and are shown as an electrical switch but might be the operating portions of a fluid valve, for example.

The appended claims form a part of the disclosure of the invention in conjunction with the foregoing application.

Although this invention has been described in its preferred form with a certain degree of particularity, it is understood that the present disclosure of the preferred form has been made only by way of example and that numerous changes in the details of construction and the combination and arrangement of parts and circuit arrangement may be resorted to without departing from the spirit and the scope of the invention as hereinafter claimed.

What is claimed is:

1. A temperature control to control heat of a vessel heated by a heating unit operable from a source of potential heat energy, comprising, in combination, first and second relatively movable operating portions, means to connect said operating portions to said heat energy source to control the flow of potential heat energy to said heating unit, sensing control means connected to receive heat proportioned to heat of said vessel, cycling means connected to intermittently act on said sensing control means to relatively vary the position of said operating portions to decrease the heat energy input to said unit upon increase in temperature of said vessel, and proportioning control means connected to receive heat proportional to heat of said heating unit to relatively vary the position of said operating portions to decrease the heat energy input to said heating unit upon temperature increase of said heating unit.

2. A temperature control operable from a voltage source to control heat of a vessel heated by a heating unit operable from a source of potential heat energy, comprising, in combination, first and second relatively movable operating portions, means to connect said operating portions to said heat energy source to control the flow of potential heat energy to said heating unit, means to relatively vary the position of said operating portions to adjust the operating condition thereof, sensing control means connected to said voltage source, cycling means connected to said voltage source to intermittently act on said sensing control means to relatively vary the position of said operating portions to decrease the heat energy input to said unit upon increase in temperature of said vessel, proportioning control means to relatively vary the position of said operating portions to decrease the heat energy input to said heating unit upon temperature increase of said heating unit, and voltage compensating control means connected to said voltage source to relatively vary the position of said operating portions to increase the heat energy input to said unit upon increase of voltage of said voltage source to counterbalance increased voltage on said sensing control means which additionally tends to decrease the heat energy input to said unit.

3. A temperature control operable from a voltage source to control heat of a vessel heated by a heating unit operable from a source of potential heat energy, comprising, in combination, first and second relatively movable operating portions, means to connect said operating portions to said heat energy source to control the flow of potential heat energy to said heating unit, manually adjustable means to relatively vary the position of said operating portions to adjust the operating condition thereof, sensing control means positioned for heat exchange relationship with said vessel, cycling means connected to said voltage source to intermittently act on said sensing control means to relatively vary the position of said operating portions to decrease the heat energy input to said unit upon increase in temperature of said vessel, proportioning control means connected to receive heat proportional to heat of said heating unit and connected to said voltage source to relatively vary the position of said operating portions to decrease the heat energy input to said heating unit upon temperature increase of said heating unit, voltage compensating control means connected to said voltage source to relatively vary the position of said operating portions to increase the heat energy input to said unit upon increase of voltage of said voltage source to compensate for increased voltage on said sensing control means which additionally tends to decrease the heat energy input to said unit, and ambient temperature control means including at least two of said proportioning control, sensing control, and cycling means to thus hold said operating portions relatively stationary for changes in ambient temperature.

4. A temperature control for a vessel heated by a heating element energizable from a voltage source, comprising, in combination, first and second control contacts, means to connect said voltage source in circuit relationship with said control contacts and with said heating element for energization thereof, sensing control means connected to said voltage source, cycling means connected to said voltage source to cyclically act on said sensing control means to relatively separate said contacts upon increase in temperature of said vessel, proportioning control means to relatively separate said contacts upon flow of current to said heating element, and voltage compensating control means to relatively move said control contacts toward each other upon increase of voltage of said voltage source to compensate for increased voltage on said sensing control means which additionally tends to separate said control contacts.

5. A temperature control for a vessel heated by a heating element energizable from a voltage source, comprising, in combination, first and second control contacts, means to connect said voltage source in circuit relationship with said control contacts and with said heating element for energization thereof, manually adjustable means to relatively vary the position of said control contacts to adjust the operating condition thereof, proportioning control means to relatively separate said contacts upon flow of current to said heating element, sensing control means connected to said voltage source, cycling means connected to said voltage source to cyclically act on said sensing control means to relatively separate said contacts upon increase in temperature of said vessel, voltage compensating control means to relatively move said control contacts toward each other upon increase of voltage of said voltage source to compensate for increased voltage on said sensing control means which additionally tends to separate said control contacts, and ambient temperature control means including at least two of said proportioning control, sensing control, and cycling means to thus hold said control contacts relatively stationary for changes in ambient temperature.

6. A temperature control for control of heat to a vessel operable through a boil range and heated by a heating element energizable from a voltage source, comprising, in combination, first and second control contacts, means to connect said voltage source through said control contacts to said heating element for energization thereof, sensing control means connected to said voltage source, cycling means connected to cyclically act on said sensing control means to relatively separate said contacts upon increase in temperature of said vessel, proportioning control means connected to said voltage source to relatively separate said contacts upon flow of current to said heating element and connected to vary the average wattage input to said heating element for various rates of boiling in said boil range, voltage compensating control means to relatively move said control contacts toward each other upon increase of voltage of said voltage source to compensate for increased voltage on said sensing control means which additionally tends to separate said control contacts, and ambient temperature control means including said proportioning and compensating control means acting in opposition for changes in ambient temperature.

7. A temperature control circuit for an electrical heating element energizable from a voltage source, comprising, in combination, a sensing element adapted to be placed in heat exchange relationship with a vessel in heat exchange relationship with said heating element and also placed in heat insulated relationship with said heating element, control contacts connected in circuit relationship with said heating element and said voltage source for controlling the flow of current to said heating element, bimetallic means connected to operate said control contacts, manually adjustable means to adjust the average temperature setting of said heating element including a boil range with high, medium and low boil settings and adapted to vary the relative position of said control contacts, ambient temperature compensation means including said bimetallic means and comprising first and second bimetallic elements acting in opposition relative to one of said control contacts, first means including cycling means imparting heat to said bimetallic means from said sensing element to open and close said control contacts, voltage compensation means including oppositely acting effects on said control contacts, and proportioning control means imparting heat to said bimetallic means in accordance with the power supplied to said heating element to change the proportion of on time to off time of said control contacts during said boil range settings for low, medium and fast boil settings.

8. A temperature control for a heating element for heating a vessel and energizable from a voltage source and operable through a boil range, comprising, in combination, contact means relatively movable between on and off conditions to control the power input to said heating element, a sensing element variable in resistance in accordance with temperature and adapted to be positioned in heat exchange relationship with said vessel, means to connect said sensing element for energization from said voltage source, control bimetallic means, cycling means, a control winding electrically connected to said sensing element and to said cycling means to impart heat to said control bimetallic means to tend to open said contact means with increasing temperature on said sensing element, proportioning bimetallic means acting on said contact means to relatively move same toward disengagement upon power being supplied to said heating element, compensating bimetallic means tending to close said contact means upon increasing temperature of said compensating bimetallic means, means for supporting said control, proportioning, said compensating bimetallic means in substantially the same degree of heat exchange relationship with said heating element, and voltage compensating winding means connected in circuit with said sensing element and said control winding, whereby changes in voltage of said voltage source are imparted both to said control winding and to said voltage compensating winding means to effect substantially no change in the relative position of said contact means, and whereby increases in ambient temperature of said bimetallic means are substantially cancelled out therein to effect substantially no change in relative position of said contact means.

9. A thermostatic control for controlled temperature of a vessel having a boil range and heated by a heating element energizable from a voltage source, comprising, in combination, a sensing element variable in impedance and adapted to be positioned in heat exchange relationship primarily with said vessel and only secondarily in heat exchange relationship with said heating element, U-shaped bimetallic means, control contacts operated by said bimetallic means to control flow of current through said heating element from said voltage source, cycling means connected to said sensing element and to said voltage source to impart heat to said bimetallic means for controlling movement thereof, proportioning control means including said bimetallic means to vary the power input to said heating element despite a substantially constant temperature of said vessel through a boil range thereof, ambient temperature control means including said U-shaped bimetallic means to affect substantially equally both legs thereof in accordance with changes of ambient temperature, and voltage compensating control means acting on said U-shaped bimetallic means to compensate for increases and decreases of voltage of said voltage source.

10. A thermostatic control for controlled temperature of a vessel having a boil range and heated by a heating element energizable from a voltage source, comprising, in combination, a sensing element variable in resistance and adapted to be positioned in heat exchange relationship primarily with said vessel and substantially insulated from heat exchange relationship with said heating element, U-shaped bimetallic means, control contacts operated by said bimetallic means to control flow of current through said heating element from said voltage source, cycling means, control winding means and said cycling means connected in circuit with said sensing element and said voltage source to impart heat to said bimetallic means for controlling movement thereof, adjustable means to adjust the operating point of said control contacts, proportioning control means including said bimetallic means to vary the power input to said heating element despite a substantially constant temperature of said vessel through a boil range thereof, and ambient temperature control means including said U-shaped bimetallic means to affect substantially equally both legs thereof in accordance with changes of ambient temperature.

11. A temperature control for a vessel heated by a heating element energizable from voltage source terminals, comprising, in combination, first and second control contacts, means to connect said voltage source terminals in circuit relationship with said control contacts and with said heating element for energization thereof, bimetallic means acting on said contact, cycling means, sensing control means connected to said voltage source through said cycling means and acting on said bimetallic means to relatively separate said contacts upon increase of temperature of said vessel, manual means to vary the relative position of said control contacts, said contacts being relatively variable in spacing through a boil range for said vessel, proportioning control means including said bimetallic means, said proportioning control means including a flexible pigtail connected to said bimetallic means for passage of load current through said bimetallic means and said pigtail, the variable spacing of said control contacts through said boil range causing variable amounts of load current through said bimetallic means to vary the rate of boiling despite a lack of change of temperature on said sensing control means.

12. A range surface unit control operable from a voltage source and comprising, in combination, primary and auxiliary bimetallic structures, primary contacts and auxiliary contacts actuated between open and closed conditions by heat responsive movements of said primary and auxiliary structures, respectively, means to energize said surface unit from said source through said primary contacts, ambient compensation means acting on both said structures, manually adjustable means acting to adjust the relative positions of said primary contacts, heat responsive resistance means in heat exchange relationship with a vessel heatable by said range surface unit, a transformer having a low voltage secondary, cycling means energized from said secondary and acting on said auxiliary structure to cycle open and closed said auxiliary contacts, voltage compensation winding means as a part of said cycling means to compensate for changes of voltage of said transformer, control winding means in heat exchange relationship with said primary structure and connected in circuit relationship with said heat responsive means and said auxiliary contacts to impart heat to said primary structure upon said auxiliary contacts being closed and inversely proportional to current flow in said heat responsive resistance means, and current responsive means acting to vary the position of said primary contacts in accordance with the current supplied to said range surface unit, said primary and auxiliary contacts being normally closed at room temperature, whereby when said range surface unit and said transformer are energized said cycling means causes cycling of said auxiliary contacts to intermittently impart heat to said primary structure via said control winding means to effect in conjunction with said current responsive means a cycling of said primary structure to maintain a substantially constant temperature of a vessel heated by said range surface unit at a temperature determined by said manually adjustable means.

13. A range surface unit control system, comprising, in combination, a base, primary and auxiliary bimetallic structures, first and second opposedly acting legs on each structure and each with first and second ends and with said second ends interconnected, adjustable means to adjustably mount said first end of said first leg of said primary bimetallic structure on said base, a first movable contact on the first end of said second leg of said primary structure, a first fixed contact carried on said base for cooperating with said movable contact, means to energize said range surface unit through said first contacts and through at least a part of said second leg of said primary structure to vary the position of said first movable contact in accordance with current to said surface unit, a control winding in heat exchange relationship with said second leg of said primary structure, a transformer having a low voltage secondary, a sensing coil mounted in proximity to said range surface unit adapted for sensing the temperature of a vessel heated by said range surface unit, means connecting in parallel said sensing coil and said control winding, means mounting the first end of said second leg of said auxiliary structure on said base, a second fixed contact on said base, a second movable contact on the first end of said first leg of said auxiliary structure to cooperate with said second fixed contact, a voltage compensating winding in heat exchange relationship with said second leg of said auxiliary structure and having one end connected to the first end of said second leg of said auxiliary structure and having the other end connected to one end of said secondary, the other end of said secondary being connected through said sensing coil to said second fixed contact, said first and second sets of contacts normally being in engagement at room temperature, whereby upon energization of said range surface unit through said first contacts and energization of said transformer the voltage compensation winding heats said auxiliary structure to cycle open and closed said second movable contact with such cycling being determined by the voltage applied to said transformer for a voltage compensation effect and during the closed condition of said second contacts heat is applied to said primary structure at said control winding, and whereby as said vessel is heated the sensing coil increases its resistance to divert an increasing amount of electrical energy to said control winding which cycles the said first movable contact and the increased electrical energy increases the off periods relative to the on periods to maintain a substantially constant temperature of said vessel.

References Cited in the file of this patent

UNITED STATES PATENTS

| | | |
|---|---|---|
| 2,510,040 | Rudahl | May 30, 1950 |
| 2,846,556 | Whinery | Aug. 5, 1958 |
| 2,910,569 | Boddy | Oct. 27, 1959 |
| 2,971,074 | Strobel et al. | Feb. 7, 1961 |
| 3,005,080 | Bletz | Oct. 17, 1961 |